US012226938B2

(12) United States Patent
Nordin et al.

(10) Patent No.: US 12,226,938 B2
(45) Date of Patent: Feb. 18, 2025

(54) DEVICE FOR PREPARATION OF EXPANDED MICROSPHERES

(71) Applicants: NOURYON CHEMICALS INTERNATIONAL B.V., Arnhem (NL); CONSTRUCTION RESEARCH TECHNOLOGY GMBH, Trostberg (DE)

(72) Inventors: Jan Nordin, Kvissleby (SE); Per Ajdén, Bergeforsen (SE)

(73) Assignees: NOURYON CHEMICALS INTERNATIONAL B.V., Arnhem (NL); CONSTRUCTION RESEARCH TECHNOLOGY GMBH, Trostberg (DE)

(*) Notice: Subject to any disclaimer, the term of this patent is extended or adjusted under 35 U.S.C. 154(b) by 0 days.

(21) Appl. No.: 17/045,388

(22) PCT Filed: Mar. 29, 2019

(86) PCT No.: PCT/EP2019/058042
§ 371 (c)(1),
(2) Date: Oct. 5, 2020

(87) PCT Pub. No.: WO2019/192936
PCT Pub. Date: Oct. 10, 2019

(65) Prior Publication Data
US 2021/0146580 A1    May 20, 2021

(30) Foreign Application Priority Data
Apr. 5, 2018    (EP) .................................... 18165829

(51) Int. Cl.
B29C 44/34    (2006.01)
B01J 13/20    (2006.01)
(Continued)

(52) U.S. Cl.
CPC .......... *B29C 44/3461* (2013.01); *B01J 13/20* (2013.01); *B29K 2101/12* (2013.01); *B29K 2105/0076* (2013.01)

(58) Field of Classification Search
CPC . B29C 44/3461; B29C 44/34; B29C 44/3403; B01J 13/20; B29K 2101/12; B29K 2105/0076; C08J 9/22; C04B 20/06
See application file for complete search history.

(56) References Cited

U.S. PATENT DOCUMENTS 3,615,972 A    10/1971   Morehouse, Jr.
3,945,956 A     3/1976   Garner
(Continued)

FOREIGN PATENT DOCUMENTS

EP    0112807 A2    7/1984
EP    0486080 A2    5/1992
(Continued)

OTHER PUBLICATIONS

EPO, European Extended Search Report issued in European Application No. 18165829.5, dated Oct. 12, 2018.
(Continued)

*Primary Examiner* — Alison L Hindenlang
*Assistant Examiner* — Shibin Liang
(74) *Attorney, Agent, or Firm* — Lorenz & Kopf LLP

(57) ABSTRACT

A device includes a heating zone having an inlet, and an outlet, a pump upstream of and in fluid communication with the heating zone, and capable of generating above-atmospheric pressure in the heating zone; an element for heating the heating zone; an expansion zone with an inlet and an outlet, said inlet of the expansion zone being connected to the outlet of the heating zone in such a way that a pressure drop is created, such that the expansion zone is at a lower pressure than the heating zone; and a back pressure genera-
(Continued)

tor downstream of the expansion zone configured to create a variable counter pressure in the expansion zone.

17 Claims, 3 Drawing Sheets

(51) Int. Cl.
   *B29K 101/12* (2006.01)
   *B29K 105/00* (2006.01)

(56) References Cited

U.S. PATENT DOCUMENTS

| | | | |
|---|---|---|---|
| 4,287,308 A | 9/1981 | Nakayama et al. | |
| 4,513,106 A | 4/1985 | Edgren et al. | |
| 5,484,815 A | 1/1996 | Petersen et al. | |
| 5,536,756 A | 7/1996 | Kida et al. | |
| 5,977,195 A * | 11/1999 | Craig | C08J 9/16 521/78 |
| 6,235,394 B1 | 5/2001 | Shimazawa et al. | |
| 6,235,800 B1 | 5/2001 | Kyuno et al. | |
| 6,509,384 B2 | 1/2003 | Kron et al. | |
| 6,617,363 B2 | 9/2003 | Ohmura et al. | |
| 6,984,347 B2 | 1/2006 | Masuda et al. | |
| 7,192,989 B2 | 3/2007 | Svedberg et al. | |
| 10,214,624 B2 * | 2/2019 | Nordin | C04B 20/06 |
| 2001/0051666 A1 | 12/2001 | Kron et al. | |
| 2002/0135084 A1 | 9/2002 | Ohmura et al. | |
| 2004/0176486 A1 | 9/2004 | Glorioso et al. | |
| 2005/0026067 A1 | 2/2005 | Masuda et al. | |
| 2013/0280364 A1 * | 10/2013 | Ong | B29C 44/3403 425/4 R |
| 2013/0281556 A1 | 10/2013 | Ong et al. | |
| 2015/0093468 A1 | 4/2015 | Ong et al. | |
| 2016/0115290 A1 * | 4/2016 | Svedberg | C04B 16/08 422/307 |

FOREIGN PATENT DOCUMENTS

| | | |
|---|---|---|
| EP | 0566367 A2 | 10/1993 |
| EP | 1067151 A1 | 1/2001 |
| EP | 1230975 A1 | 8/2002 |
| EP | 1288272 A1 | 3/2003 |
| EP | 1598405 A1 | 11/2005 |
| EP | 1811007 A1 | 7/2007 |
| EP | 1964903 A1 | 9/2008 |
| JP | 862286534 A | 12/1987 |
| JP | 2004237470 | 8/2004 |
| JP | 2005272633 A | 10/2005 |
| WO | 02096635 A1 | 12/2002 |
| WO | 2004072160 A1 | 8/2004 |
| WO | 2007091960 A1 | 8/2007 |
| WO | 2007091961 A1 | 8/2007 |
| WO | 2007142593 A1 | 12/2007 |
| WO | 2014198532 A1 | 12/2014 |
| WO | 2016091739 A1 | 6/2016 |
| WO | 2016091742 A1 | 6/2016 |
| WO | 2016091847 A1 | 6/2016 |

OTHER PUBLICATIONS

EPO, International Search Report issued in International Application No. PCT/EP2019/058042, dated Aug. 30, 2019.

* cited by examiner

DEVICE FOR PREPARATION OF EXPANDED MICROSPHERES

CROSS-REFERENCE TO RELATED APPLICATION

This application is a U.S. National-Stage entry under 35 U.S.C. § 371 based on International Application No. PCT/EP2019/058042, filed Mar. 29, 2019, which was published under PCT Article 21(2) and which claims priority to European Application No. 18165829.5, filed Apr. 5, 2018, which are all hereby incorporated in their entirety by reference.

TECHNICAL FIELD

The present disclosure relates to a method of producing expanded thermoplastic microspheres and a device therefore.

BACKGROUND

Thermally expandable microspheres are known in the art and described in detail in, for example, U.S. Pat. No. 3,615,972. Various grades of expandable microsphere, having different expansion temperature, are commercially available from AkzoNobel under the trademark Expancel™, both as dry free flowing microspheres and as an aqueous slurry of microspheres.

Such expandable microspheres comprise a blowing agent encapsulated within a thermoplastic shell. Upon heating, the blowing agent evaporates to increase the internal pressure, at the same time as the shell softens, resulting in significant expansion of the microspheres, normally from 2 to 5 times their diameter.

Thermoplastic microspheres can be used in various applications as unexpanded or pre-expanded. Examples of products where dry (essentially water free) pre-expanded microspheres are used are as sensitizer in emulsion explosives and as light weight filler in solvent based paints and various thermosetting materials such as cultured marble, polyester putty and artificial wood. In many products, such as water based paints and coatings, thermal printing papers, porous ceramics and emulsion explosives, wet pre-expanded microspheres are used.

Transporting pre-expanded microspheres require significant space, for which reason the unexpanded microspheres often are transported to the end user for the expanded microspheres and expanded on-site. The microspheres may then be expanded close to or directly into a process for producing the final product, e.g. any of those mentioned above.

Various methods and devices have been developed for expanding thermoplastic microspheres.

U.S. Pat. Nos. 5,484,815 and 7,192,989 disclose methods and devices suitable for expanding dry microspheres.

U.S. Pat. No. 4,513,106 discloses a method and a device suitable for expanding microspheres in an aqueous slurry by introducing steam to the slurry in a pressure zone in an amount sufficient for heating the microspheres and at least partially expand them, followed by allowing the partially expanded microspheres to leave the pressure zone under a pressure drop whereby the microspheres are further expanded and accelerated into a stream with a velocity of at least 1 m/s.

In WO2014198532 an expander for non-expanded thermally expandable microspheres is described, wherein a slurry of the microspheres in a suitable carrier is brought into a pressure zone and heated without contacting the slurry directly with the heating medium. The heating zone may for example be a heat exchanger. The advantage of the indirect heating, over steam expansion, is that there is no need to introduce (extra) water into the slurry. The indirect heating also allows for other heating- and slurry media than steam and water, and thus creates a wider flexibility in temperature ranges.

The apparatus disclosed in WO2014198532 comprises a heating zone which is capable of withstanding a pressure of at least 4 bars. The apparatus comprises a pump for feeding a slurry of thermally expandable thermoplastic microspheres into the heating zone. The pump is capable of generating a pressure of at least 4 bars in the heating zone. The pressure within the heating zone is maintained such that the thermally expandable thermoplastic microspheres do not fully expand. The apparatus comprises an element for heating the slurry of thermally expandable thermoplastic microspheres in the heating zone to a temperature of at least 60° C. without any direct contact of the slurry to any fluid heat transfer medium. After the microspheres are heated in the heating zone, the slurry is withdrawn from the heating zone and experiences a pressure drop, into a zone with a pressure sufficiently low for the microspheres to start expanding.

A further improvement of an expansion device is described in WO2016091847. To reduce potential agglomeration of expanded particles, the slurry is withdrawn from the heating zone through an outlet pipe, and the microparticles start to expand in the outlet pipe, after they have left the heating zone where they were heated under pressure. In WO2016091847 it is described that the outlet pipe (where the microparticles start to expand) may be attached to a downstream distribution pipe (also referred to as "mixing zone"). The distribution pipe has an inlet for a cooling medium, and the outlet pipe is attached downstream of this inlet to the distribution pipe (or "mixing zone") between the inlet and an outlet of the distribution pipe.

As an additional measure, to keep the pressure in the heating zone sufficiently high, it is thought in WO2016091739 to put a back pressure generator in fluid communication with the heating zone, said back pressure generator being capable of increasing pressure in the heating zone, after which the particles experience a pressure drop and begin to expand (e.g in the "expansion zone" that may take the shape of an outlet pipe as described in WO2016091847). The back pressure generator is capable of restricting and/or controlling the flow of the fluid material through the heating zone (called "treatment zone" in WO2016091739), to ensure that the temperature within the heating zone is sufficient to allow the expandable polymeric microspheres to expand to a desired degree. The back pressure generator may provide increased pressure within the heating zone, and may comprise, for example, a flow control valve or a flow restriction device, such as an orifice nozzle.

BRIEF SUMMARY

This disclosure provides a device for expanding unexpanded, thermally expandable, thermoplastic microspheres, comprising:
- a heating zone having an inlet, and an outlet,
- a pump upstream of and in fluid communication with the heating zone, and capable of generating above-atmospheric pressure in the heating zone; and,
- a feature for heating the heating zone;

an expansion zone with an inlet and an outlet, said inlet of the expansion zone being connected to the outlet of the heating zone in such a way that a pressure drop is created, such that the expansion zone is at a lower pressure than the heating zone, and a back pressure generator downstream of the expansion zone configured to create a variable counter pressure in the expansion zone.

This disclosure also provide a process for expanding unexpanded, thermally expandable, thermoplastic microspheres comprising a thermoplastic polymer encapsulating a blowing agent, wherein said blowing agent is a liquid having a boiling temperature not higher than the softening temperature of the thermoplastic polymer shell, the process comprising:

feeding a slurry of unexpanded, thermally expandable, thermoplastic microspheres into a heating zone by a pump capable of generating higher than atmospheric pressure in the heating zone, heating the microspheres to a temperature above their softening temperature, while under a pressure sufficiently high to ensure they do not fully expand;

passing the so-heated microspheres from the heating zone to an expansion zone, such that a pressure drop is created, resulting in a pressure in the expansion zone sufficiently low for the microspheres to expand, and removing the expanded microspheres from the expansion zone, wherein the expansion zone is configured to create a variable counter pressure by a back-pressure generator downstream of the expansion zone.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
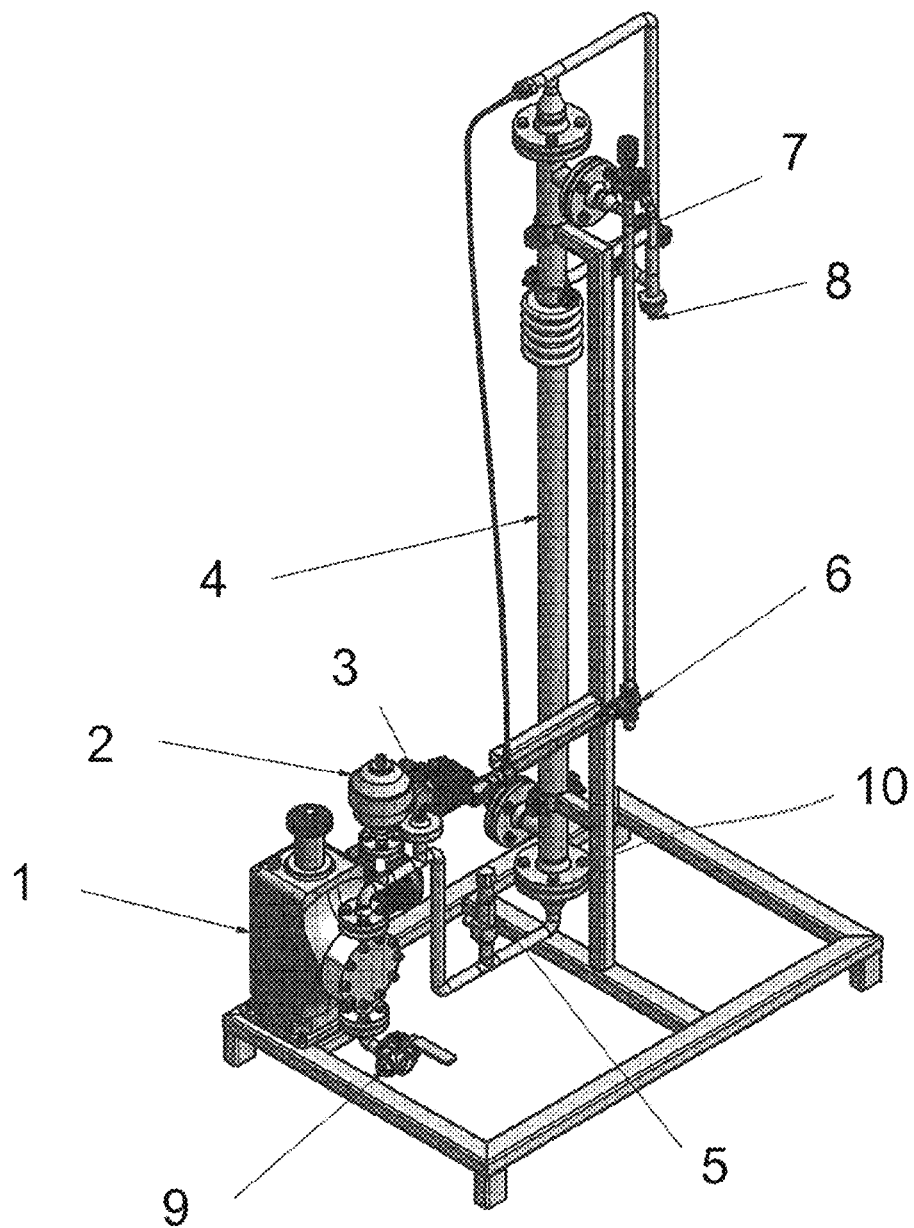
FIG. 1 is a perspective view of an expansion device described in WO 2014/198532 and WO 2016/091847.

The following detailed description is merely exemplary in nature and is not intended to limit the disclosure or the application and uses of the subject matter as described herein. Furthermore, there is no intention to be bound by any theory presented in the preceding background or the following detailed description.

The current disclosure relates to a device for expanding unexpanded, thermally expandable, thermoplastic microspheres comprising:

a heating zone having an inlet, and an outlet, a pump upstream of and in fluid communication with the heating zone, and capable of generating above-atmospheric pressure in the heating zone;

an element for heating the heating zone;

an expansion zone with an inlet and an outlet, said inlet of the expansion zone being connected to the outlet of the heating zone in such a way that a pressure drop is created, such that the expansion zone is at a lower pressure than the heating zone, and a back pressure generator downstream of the expansion zone configured to create a variable counter pressure in the expansion zone.

The unexpanded, thermally expandable thermoplastic microspheres typically comprise a thermoplastic polymer encapsulating a blowing agent, wherein said blowing agent is a liquid having a boiling temperature not higher than the softening temperature of the thermoplastic polymer shell.

In various embodiments, the process comprises:

feeding such a slurry of unexpanded, thermally expandable, thermoplastic microspheres into a heating zone by a pump capable of generating higher than atmospheric pressure in the heating zone, heating the microspheres to a temperature above their softening temperature, while under a pressure sufficiently high to ensure they do not fully expand;

passing the so-heated microspheres from the heating zone to an expansion zone, such that a pressure drop is created, resulting in a pressure in the expansion zone sufficiently low for the microspheres to expand, and removing the expanded microspheres from the expansion zone, wherein the pressure in the expansion zone can be varied, for example by a back-pressure generator downstream of the expansion zone.

The method can employ the above-described device.

In embodiments, the device comprises:

a heating zone having an inlet, into which a slurry of unexpanded thermally expandable thermoplastic microspheres in a liquid medium is fed, and an outlet, from which the slurry is withdrawn, a pump upstream of the heating zone for feeding the slurry of unexpanded expandable thermoplastic microspheres into the inlet of the heating zone and capable of generating a pressure in the heating zone sufficiently high so the microspheres in the slurry do not fully expand, an element for heating the slurry of unexpanded expandable microspheres to a temperature above the softening temperature of the thermoplastic polymer in the specific medium used as carrier liquid, and an expansion zone with an inlet and an outlet, said inlet of the expansion zone being connected to the outlet of the heating zone in such a way that a pressure drop is created, resulting in a pressure in the expansion zone sufficiently low for the thermoplastic microspheres to expand, and a back pressure generator downstream of the expansion zone configured to create a variable counter pressure.

The back pressure generator downstream of the expansion zone is adjustable, and configured to create a variable counter pressure, to influence the pressure in the expansion zone, where the particles start to expand.

The counter pressure generated in the expansion zone, by the back pressure generator, is typically low enough to not significantly affect the pressure in the heating zone as well. The back pressure can be operated in such a way that the desired effect is achieved. The effect is determined by the circumstances and the back pressure generator allows the operator of the device to vary the settings on a case by case (batch by batch) basis, for example to adjust for batch to batch variation. Depending on the result achieved initially, at a certain setting (e.g the (variation in) density of the expanded particles) the settings of the back pressure generator can be adjusted to slightly increase or decrease the back pressure until the desired expansion (density and/or uniformity) is obtained.

It has been found that by introducing the possibility to adjust the pressure in the expansion zone with an adjustable back pressure generator, the density of the expanded particles (the degree to which they expand) can be influenced. In this way, batch to batch variation can be adjusted for.

Devices (expanders) such as those disclosed in the prior art, normally operate with a pre-set constant flow rate of slurry of expandable microspheres through the expander. The temperature in the expander is normally set (constant) and the dimensions of the heating zone and the expansion zone in the expander are set (constant) as well. There has therefore been no practical way to vary or influence the final density of the expanded microspheres. The density of the produced material is normally very stable over production time, but product batch variations may cause density variations between batches.

It has been found that by varying the back pressure (counter pressure) in the expansion zone the final density of the particles can be influenced and particles can consistently expand even to very low densities (>about 40 g/L).

The device according to present disclosure can be used for all kinds of thermally expandable thermoplastic microspheres. As used herein, thermally expandable thermoplastic microspheres refers to a thermoplastic polymer shell encapsulating a blowing agent. When expanded by heat the thermally expandable thermoplastic microspheres are referred to as expanded thermoplastic microspheres.

The thermally expandable thermoplastic microspheres can be those marketed by AkzoNobel under the trademark Expancel™. Thermally expandable thermoplastic microspheres and their manufacture are disclosed in, for example, U.S. Pat. Nos. 3,615,972, 3,945,956, 4,287,308, 5,536,756, 6,235,800, 6,235,394, 6,509,384, 6,617,363, 6,984,347, US 2004/0176486, EP 486080, EP 566367, EP 1067151, EP 1230975, EP 1288272, EP 1598405, EP 1811007, EP 1964903, WO 2002/096635, WO 2004/072160, WO 2007/091960, WO 2007/091961, WO 2007/142593, JP 1987-286534 and JP 2005-272633, which are hereby incorporated herein by reference in various non-limiting embodiments.

The thermoplastic polymer shell can be made from polymers or co-polymers by polymerising various ethylenically unsaturated monomers. The ethylenically unsaturated monomers can be nitrile containing monomers, such as acrylonitrile, methacrylonitrile, alpha-chloroacrylonitrile, alpha-ethoxyacrylonitrile, fumaronitrile and crotonitrile, acrylic esters, such as methylacrylate or ethyl acrylate, methacrylic esters, such as methyl methacrylate, isobornyl methacrylate and ethyl methacrylate, vinyl halides, such as vinyl chloride, vinylidene halides, such as vinylidene chloride, vinyl pyridine, vinyl esters, such as vinyl acetate, styrene, optionally substituted, such as styrene, halogenated styrenes and alpha-methyl styrene, dienes, such as butadiene, isoprene and chloroprene, and any mixtures thereof.

The ethylenically unsaturated monomers may also comprise crosslinking multifunctional monomers. The crosslinking multifunctional monomers include any one of divinyl benzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth)acrylate, pentaerythritol hexa(meth)acrylate, dimethylol tricyclodecane di(meth)acrylate, triallylformal tri(meth)acrylate, allyl methacrylate, trimethylol propane tri(meth)acrylate, trimethylol propane triacrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal or triallyl isocyanate, triallyl isocyanurate or any mixtures thereof. The crosslinking multifunctional monomers make up from about 0.1 to about 1 wt %, most typically from about 0.2 to about 0.5 wt % of the total amounts of ethylenically unsaturated monomers of the thermoplastic polymer shell.

It is preferable that the thermoplastic polymer shell constitutes from about 60 to about 95 wt % of the thermally expandable thermoplastic microsphere and more typically from about 75 to about 85 wt %.

A softening temperature of the thermoplastic polymer shell corresponds to its glass transition temperature ($T_g$). $T_g$ is within the range of about 50 to about 250° C., and more typically in the range of about 60 to about 200° C.

The blowing agent in the thermally expandable thermoplastic microspheres can be a liquid which has a boiling temperature (at room temperature and pressure) not higher than the $T_g$. The blowing agent can be at least one hydrocarbon or any mixtures thereof. The hydrocarbons can be selected from n-pentane, isopentane, neopentane, butane, isobutane, hexane, isohexane, neohexane, heptane, isoheptane, octane and isooctane. The hydrocarbons can also be petroleum ether, chlorinated or fluorinated hydrocarbons, such as methyl chloride, methylene chloride, dichloro ethane, dichloro ethylene, trichloro ethane, trichloro ethylene and trichlorofluoro methane. The blowing agent is typically at least one of isobutane, isopentane, isohexane, cyclohexane, isooctane, isododecane, and any mixtures thereof. The blowing agent is more typically isobutane and isopentane.

The blowing agent is present in an amount of from about 5 to 40 wt % of the thermally expandable thermoplastic microspheres.

The boiling temperature (at room temperature and pressure) of the blowing agent is typically between about −20 to about 200° C., more typically between about −20 to about 150° C. and even more typically between about −20 to about 100° C.

A temperature at which the thermally expandable thermoplastic microspheres begin expanding at atmospheric pressure is referred to as Tstart. Tstart depends on the type and combination of the thermoplastic polymer shell and the blowing agent. The thermally expandable thermoplastic microspheres used in the present disclosure typically have a Tstart from between about 40 to about 230° C. and more typically between about 60 to about 180° C.

Unexpanded thermally expandable thermoplastic microspheres may hereinafter be referred to as expandable microspheres. The particle size of expandable microspheres can vary within wide limits and may be selected with respect to the desired properties of the product in which they are used. In most cases, the preferred volume median diameter, as determined by laser light scattering on a Malvern Mastersizer Hydro 2000 SM apparatus on wet samples, is from about 1 µm to about 1 mm, typically from about 2 µm to about 0.5 mm and typically from about 3 µm to about 100 µm. The diameter of the microspheres increases at expansion, for example by a factor from about 2 to about 5.

The liquid medium of the slurry (the carrier liquid) of expandable microspheres may be any liquid that is inert in respect of the microspheres and can withstand the temperature to which the slurry is heated. In many cases water or a water based liquid is preferred, thus forming an aqueous slurry, but depending on the intended use of the expanded microspheres it may also be preferred with non-aqueous liquids for the slurry, such as at least one of vegetable oil, mineral oil and glycerol, which liquids may be free from water. Since no steam or water in any other form needs to be added to the slurry in the method of the disclosure, it is possible to prepare water free expanded microspheres that can be used directly in applications where no water is desired. Furthermore, as no other fluid media needs to be added to the slurry, it is possible to prepare expanded microspheres having a high and controlled the solids content.

In most commercial methods of producing expandable microspheres they are usually first obtained in an aqueous slurry, and such a slurry can be used directly in the method of the disclosure, optionally after dilution or dewatering to a desired content of microspheres. On the other hand, such an aqueous slurry may be dried to obtain essentially water free microspheres that can be used for preparing a slurry in an non-aqueous liquid.

The content of expandable microspheres in the slurry depends on what is desired for the product obtained after expansion. The upper limit is limited by the pumpability of the slurry and by the transportability of the slurry through the heating zone. In most cases the content of expandable microspheres is suitably from about 5 to about 50 wt %, typically from about 10 to about 40 wt % and typically from about 15 to about 30 wt %.

The slurry of expandable microspheres flows through the heating zone that can be made up of any vessel, pipe or tube provided with an inlet and an outlet and withstanding the pressure maintained therein.

The heating zone in the device comprises an element for heating the slurry of expandable microspheres to a temperature above the softening temperature of the thermoplastic polymer in the specific medium used as carrier (the carrier liquid). The element for heating the slurry in the heating zone may, for example, be a fluid heat transfer medium not being in direct contact with the slurry, electric heating elements or microwaves. For example, the heating zone may comprise a heat exchanger comprising at least one pipe or tube surrounded by a heat transfer medium not being in direct contact with the slurry of expandable microspheres. The heat transfer medium may be any suitable fluid medium such as hot water, steam or oil. As an alternative, heat may be provided by electric heating elements, e.g. inside or outside the heating zone or in the walls thereof, or any combination thereof. As a further alternative, heating may be provided by electromagnetic radiation such as microwaves.

The vessel or the at least one pipe or tube in which the slurry of expandable microspheres flows through the heating zone is typically of a thermally conductive material like steel or cupper, particularly if the heating of the slurry is provided by a fluid heat transfer medium or by electric heating elements. If the heating is provided by electromagnetic radiation, the vessel or at least one pipe or tube is typically of a material permeable for such radiations, such as various polymeric materials.

In a heat exchanger comprising at least one pipe or tube, such at least one pipe or tube may, for example, each have an inner diameter from about 5 to about 20 mm, typically from about 7 to about 15 mm and most typically from about 9 to about 12 mm. The thickness of the walls of the at least one pipe or tube is suitably from about 0.5 to about 3 mm, typically from about 0.7 to about 1.5 mm.

If heating is made by electric heating elements, such elements may e.g. be provided outside and/or inside at least one pipe or tube, for example a single pipe or tube. Such a pipe or tube may, for example, have an inner diameter from about 20 to about 80 mm or from about 35 to about 65 mm. For example, an electric heating element may be provided in the centre inside a pipe or tube so the slurry of expandable microspheres flow in the gap around that heating element. Such an electric heating element may itself be a pipe or tube with the primary electric heating source inside thereof so the heat is transferred through the wall to the slurry flowing in the gap. Typically electric heating elements are provided both inside and outside the at least one pipe or tube.

The optimal dimensions and the capacity of an element for heating the slurry is determined by the flow rate of slurry, slurry concentration and temperature of incoming slurry and should be sufficient for the slurry to reach a temperature high enough for the microspheres to expand when pressure drops after passing the outlet of the heating zone. This temperature is always higher than the volatilization temperature of the blowing agent of the specific microsphere.

The device is equipped with a pump upstream of the heating zone for feeding a slurry of unexpanded expandable thermoplastic microspheres in a liquid medium (carrier liquid) into the inlet of the heating zone. The pump is capable of generating a pressure in the heating zone sufficiently high so the microspheres in the slurry do not fully expand. Examples of suitable pumps include hydraulic diaphragm pumps, piston pumps, screw pumps (e.g. eccentric screw pumps), gear pumps, rotary lobe pumps, centrifugal pumps, etc. Hydraulic diaphragm pumps are particularly preferred. The pump typically also creates the force for transporting the slurry through the heating zone to the outlet thereof. The device may further be provided with a conduit for transportation of the slurry of expandable microspheres to the pump, for example from a tank holding the slurry.

The exact pressure required in the heating zone depends on the temperature and the type of microsphere and typically it substantially corresponds to the vapour pressure of the blowing agent of the expandable microspheres. Typically the pressure maintained in the heating zone is at least about 10 bars, most typically at least about 20 bars or at least about 30 bars. The upper limit is determined by practical considerations and may, for example, be up to about 40 bars or up to about 50 bars. The heating zone should thus be capable of withstanding such a pressure.

The temperature of the expandable microspheres in the heating zone is usually essentially the same as the temperature of the slurry therein. The exact temperature to which the slurry is heated depends on the grade of microspheres. For most grades of microspheres the temperature is typically within the range from about 60 to about 160° C. or from about 70 to about 150° C., although higher temperatures, such as about 200° C. or even about 250° C. or higher may be needed for some grades of microspheres. The element for heating the slurry should thus typically be capable of heating the slurry to such a temperature.

In the heating zone a flow of slurry of expandable microspheres is transported from the inlet to the outlet and heated under pressure to a temperature high enough for the microspheres to expand when the pressure drops at the outlet of the heating zone and they enter the zone with a sufficiently low pressure. The average residence time of the microspheres in the heating zone is typically long enough to assure that a sufficiently high temperature of the slurry is reached and maintained for subsequent expansion. In order to assure production of a high and even quality, the device may optionally further be provided with a pulsation damper stabilising the flow of the slurry.

The thermally expandable thermoplastic microspheres do not fully expand in the heating zone when heated, due to the elevated pressure in the heating zone. When leaving the heating zone the microparticles enter an expansion zone. The inlet of the expansion zone is connected to the outlet of the heating zone. In order to maintain sufficiently high pressure in the heating zone, the slurry of expandable microspheres are withdrawn from the heating zone through an outlet thereof that may be provided with any suitable element for creating a pressure drop corresponding to the pressure difference between inside the heating zone and the expansion zone, typically a flow area restriction, such as a valve, a nozzle or any other kind of narrow passage. The outlet of the heating zone may, for example, be a typically insulated pipe or tube having a flow area restriction at the end thereof, such as an opening having a diameter from about 0.5 to about 0.05 times, typically from about 0.3 to about 0.1 times the inner diameter of that pipe or tube. Such a pipe or tube may be stiff or flexible, which in the latter easily can be directed to a desired exit point for the microspheres without moving the entire device.

After the particles leave the heating zone they expand in the "expansion zone". The pressure after the pressure drop, in the expansion zone is sufficiently low for the thermoplastic microspheres to expand. Usually it is essentially atmospheric pressure but may be maintained higher (or lower) depending on the required density of the microspheres. To keep the temperature high the pipe may be insulated.

When the expansion starts at the pressure drop the flow of microspheres also accelerates significantly. In order to optimize the disintegration of the microspheres and avoid agglomeration it is preferred if the pressure drop takes place over as short a distance as possible in the flow direction.

The expansion zone can comprise a pipe or tube with a diameter, that is (at least about 2 times) wider than the diameter of the tube(s) in the heating zone. When in the form of the flexible tube, this facilitates directing the expanded thermoplastic microspheres to their end use application.

In the device according to the disclosure the back pressure generator may be a flow restriction adjuster placed in or after the outlet of the expansion zone. A restricted flow area will decrease the "volume flow per unit pressure drop". In other words; the pressure upstream of the expansion zone is increased and the increased pressure may affect the final density of the expanding microspheres. It has bene found that a higher pressure results in a higher density of the expanded particles This counter pressure can be varied by adjusting the flow restriction adjuster (e.g. by diminishing the outflow opening in the outlet of the expansion zone) according to needs (e.g. to diminish batch to batch variation and/or or ensure parties expand to the desired density within the device) under the specific circumstances and settings of the device.

The device according to the disclosure may further be equipped with a distribution pipe, downstream of the expansion zone. The outlet of the expansion zone may be connected between an inlet and outlet of the distribution pipe. A flow of the flow of cooling medium is fed into the inlet (upstream of the connection to the outlet of the expansion zone) of the distribution pipe. The expanded particles traverse with the flow of cooling medium in the direction of the outlet of the distribution pipe. The flow of cooling medium entering the distribution pipe facilitates the cooling of the expanded thermoplastic microspheres as they enter the distribution pipe, and may prevent agglomeration of the expanded thermoplastic microspheres.

The cooling medium can be air, water, nitrogen gas, or any other gasses or liquids, provided they are inert to the expanded thermoplastic microspheres. The cooling medium can also be a flow of particles such as chalk particles, calcium carbonate particles, silica particles, clay particles and TiO2 particles or any combination thereof. The addition of the cooling medium through the inlet of the distribution pipe ensure a homogenous mixture of expanded thermoplastic microspheres.

The distribution pipe may comprise at least one mixing/separating elements downstream from the attachment of the outlet of the expansion zone.

In a device according to the disclosure, equipped with a distribution pipe, an alternative way of varying the counter pressure is by changing the pressure of the cooling medium in the distribution pipe. To this effect the back pressure generator may comprise a flow adjuster for the flow of cooling medium through the distribution pipe. This flow adjuster can be gradually introduced into the distribution pipe.

The appended Figures illustrate embodiments of the disclosure.

FIG. 1 shows the expansion device described in WO 2014/198532 and WO 2016/091847. The device comprises a hydraulic diaphragm pump, 1, connected to a heat exchanger, 4, forming a heating zone, and a pulsation damper, 2. The heat exchanger, 4, is provided with an inlet, 10, and an outlet, 8, in the form of a pipe provided with a flow area restriction at the end in the form of a nozzle. The heat exchanger, 4, further comprises one or a plurality of tubes (not shown) surrounded by a heat transfer medium (not shown) such as hot water, steam or oil. The device further comprises a pressure gauge, 3, a safety valve, 5, a control valve, 6, a thermometer, 7, and a three-way valve, 9.

The device is operated by pumping a slurry of expandable microspheres, e.g. from a slurry tank (not shown), by the hydraulic diaphragm pump, 1, through the heat exchanger, 4, in which it is heated by the heat transfer medium to a temperature at which the microspheres start to expand or at least would have started to expand at atmospheric pressure. The hydraulic diaphragm pump, 1, creates a pressure sufficient for transporting the slurry through the heat exchanger, 4, and prohibiting complete expansion of the microspheres therein. The hot slurry flows out into the free air through outlet, 8, optionally provided with a flow area restriction, creating a pressure drop to atmospheric pressure, resulting in rapid expansion and cooling of the microspheres in free air. The pulsation damper, 2, inhibits fluctuations of the flow of the slurry from the hydraulic diaphragm pump 1. The pressure and the temperature in the heat exchanger can be monitored by the pressure gauge, 3, and the thermometer, 7, respectively. The equipment can be cleaned by exchanging the slurry of expandable microspheres for e.g. washing water with the aid of the 3-way valve, 9, prior to the pump, 1. The flow and pressure of the heat transfer medium used in the heat exchanger, 4, is regulated by the control valve, 6.

Figure 2:
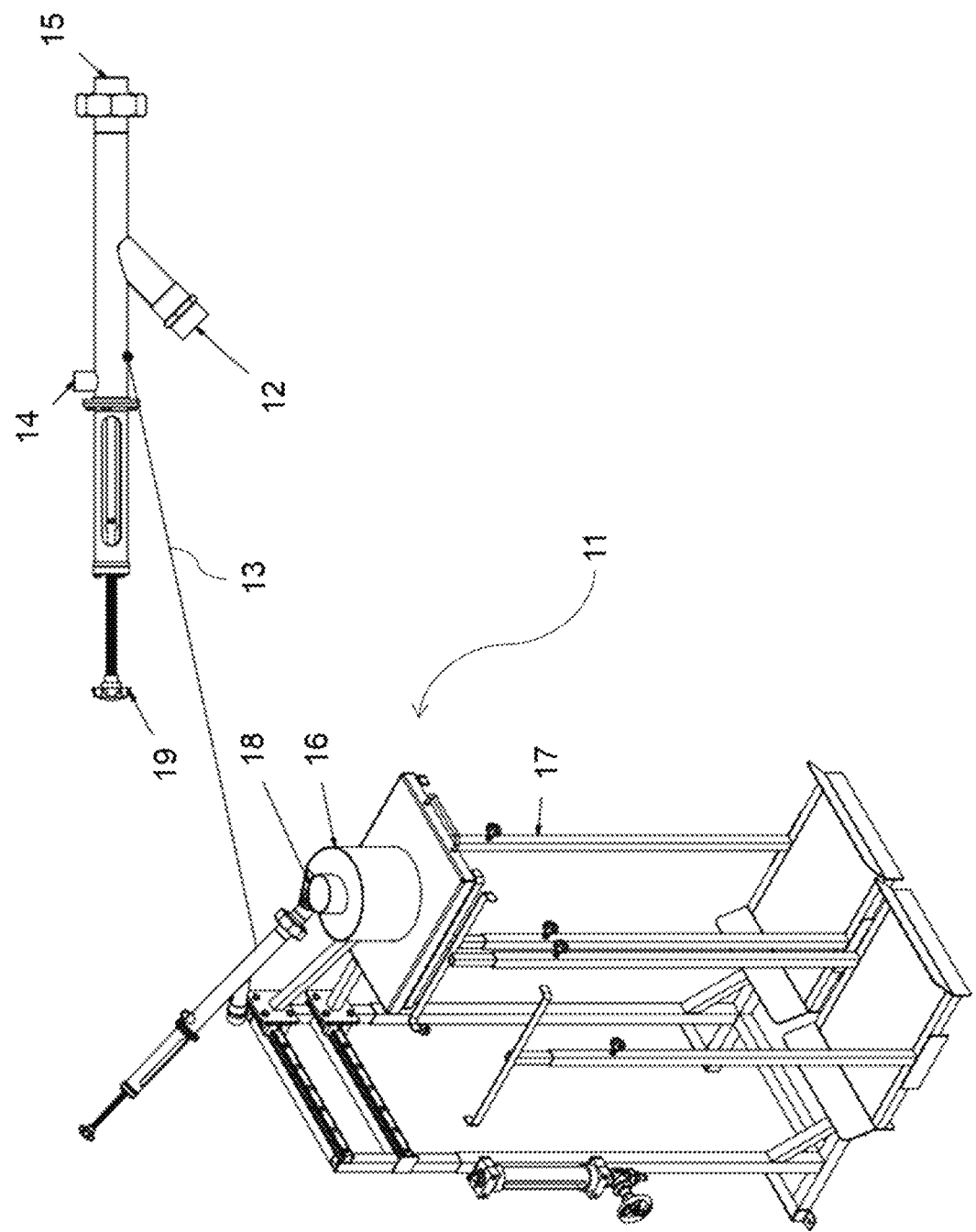
FIG. 2 is a perspective view of a bagging station and an embodiment of a back pressure generator.

FIG. 2 shows a bagging station, 11, that can be connected to the above device, illustrating an embodiment of the back pressure generator mounted on it.

The outlet of an expansion zone, 8 (c.f. FIG. 1) can be connected (optionally via a flexible tube) to the inlet, 12, of a distribution pipe, 13, (which is also shown in expanded form in the figure). The inlet, 12, connects to the distribution pipe, 13, at a point between a cooling medium inlet, 14, and the outlet of the distribution pipe, 15. The outlet of the distribution pipe, 15, is connected to a cyclone separator, 16, on the bag stand, 17, for a bag (not shown) in which the fully expanded microparticles are collected. The cyclone separator, 16, comprises a ventilation outlet, 18.

The back pressure generator in the exemplified embodiment comprises a flow restrictor adjuster, 19, that is placed in the distribution pipe and can be inserted to variable length into the flow of expanding particles. This will influence the back pressure generated in the expansion zone, 8, connected to inlet, 12.

EXAMPLES

Example 1

A water based slurry containing 20 wt % Expancel grade 461SLU40 microspheres and dispersion/stabilization additives is pumped with a pump providing a pressure of 20 bar through the heating zone (heat exchanger) of an expansion unit with a flow rate of 120 L/h. The slurry was heated to 131° C. by the heat exchanger. The heated, expanding microsphere material was pushed through the outlet of the heating zone into a wider outlet pipe (expansion zone, 250 cm long 4 cm wide) and subsequently entered a distribution pipe (24 cm long, 4 cm wide) where the material met a flow of cooling air (1.5 m3 per minute) before exiting via a separation cyclone into a collector bag. In the course of the experiment, a flow restrictor was gradually introduced into the material flow in the distribution pipe. Expancel material was sampled for different settings of the flow restrictor, from only 8 cm of the flow restrictor in the material flow to 24 cm of the flow restrictor in the material flow. The properties of the material produced in this experiment are listed in Table 1. The solid content was quite stable at 21.5±1% but the density went from 20 g/L with 8 cm flow restrictor to 30 g/L with 24 cm flow restrictor in the material flow.

TABLE 1

Properties of Expanded Expancel grade 461SLU40 at different settings for the flow restrictor

| Flow restrictor in flow (cm) | Temperature ° C. | Solid content wt % | Density* g/L |
| --- | --- | --- | --- |
| 8 | 131 | 20.8 | 18.5 |
| 12 | 131 | 21.6 | 20.0 |
| 16 | 131 | 21.8 | 26.5 |
| 20 | 131 | 22.0 | 29.7 |
| 24 | 131 | 22.4 | 30.1 |

*Density measured in gram per liter, not including the voids between the microspheres, and is measured with a pycnometer (Micromeritics).

Example 2

The procedure of Example 1 was repeated, except this time the slurry was heated to 120° C., and the flow restrictor settings were 5 cm to 11 cm in the material flow. The pressure in the distribution zone was also measured. Results are shown in Table 2.

As with example 1, a clear correlation can be seen between the distribution pipe pressure/flow restrictor setting and the product density.

TABLE 2

Properties of Expanded Expancel grade 461SLU40 at different settings for the flow restrictor

| Flow restrictor in flow (cm) | Temperature ° C. | Solid content wt % | Pressure (bar) | Density* g/L |
| --- | --- | --- | --- | --- |
| 5.0 | 120 | 20.7 | 1 | 23.8 |
| 7.0 | 120 | 26.5 | 1.8 | 26.5 |
| 9.0 | 120 | 28.8 | 2.5 | 28.8 |
| 10.0 | 120 | 32.3 | 3 | 32.3 |
| 11.0 | 120 | 33.3 | 3.3 | 33.3 |

*See Table 1

Example 3

The procedure of Example 2 was repeated, except that a temperature of 122° C. was used, and the flow restrictor settings were 5 cm to 21 cm in the material flow. Results are shown in Table 3.

TABLE 3

Properties of Expanded Expancel grade 461SLU40 at different settings for the flow restrictor

| Flow restrictor in flow (cm) | Temperature ° C. | Solid content wt % | Pressure (bar) | Density* g/L |
| --- | --- | --- | --- | --- |
| 5.0 | 122 | 22.0 | 1.2 | 21.6 |
| 9.2 | 122 | 22.1 | 2.8 | 27.2 |
| 15.0 | 122 | 22.1 | 3.3 | 32.5 |
| 20.7 | 122 | 22.1 | 3.4 | 33.1 |

*See Table 1

The same correlation between pressure or flow restrictor setting and product density was observed.

Example 4

Figure 3:
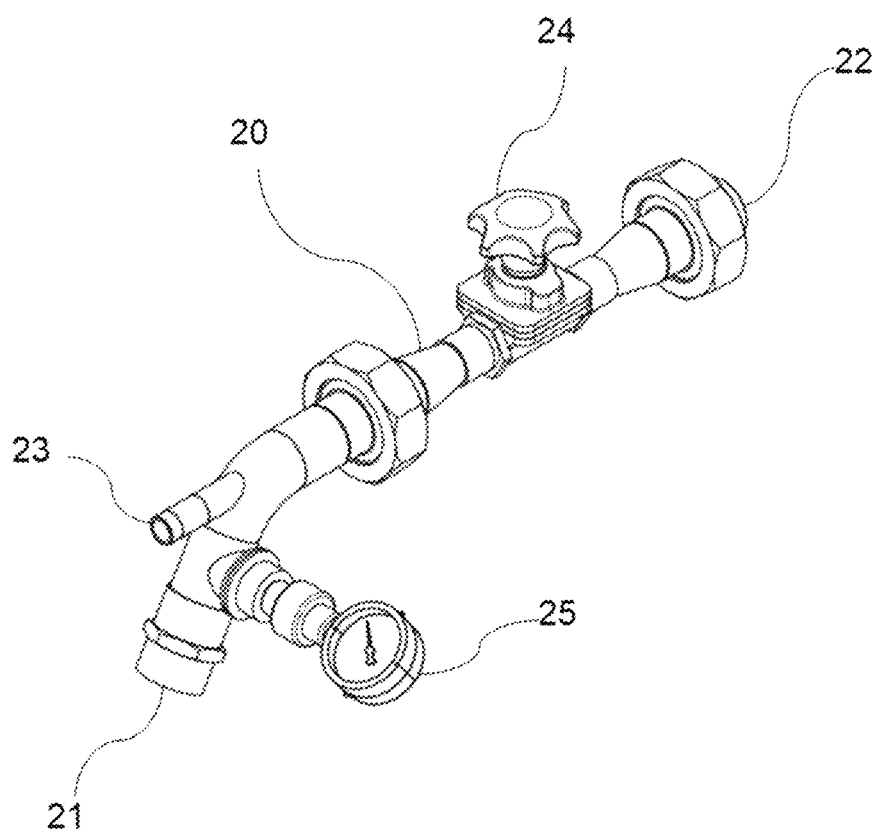
FIG. 3 is a perspective view of a distribution pipe comprising an inlet for microspheres that connects to an outlet from an expansion zone.

The procedure of Example 2 was repeated, except that the slurry was heated to 123° C., and the flow restrictor was replaced by a flow valve, in order to build up the pressure in the distribution pipe. This is illustrated in FIG. 3. In this figure, the distribution pipe, 20, comprises an inlet for the microspheres, 21, that connects to the outlet from the expansion zone. There is also an outlet for the microspheres, 22, and a cooling medium (air) inlet, 23. Flow valve, 24, was used to vary the pressure in the distribution zone, as measured by pressure gauge, 25. Results are shown in Table 4.

This experiment confirms that use of a restrictor valve produces the same correlation between distribution pipe pressure and product density.

TABLE 4

Properties of Expanded Expancel grade 461SLU40 at different flow valve settings

| Distribution Pipe Pressure (bar) | Temperature ° C. | Solid content wt % | Density* g/L |
| --- | --- | --- | --- |
| 0.5 | 123 | 21.8 | 18.9 |
| 1.0 | 123 | 22.0 | 22.2 |
| 1.5 | 123 | 22.1 | 25.1 |
| 2.0 | 123 | 22.3 | 34.1 |
| 3.0 | 123 | 22.4 | 39.0 |

*See Table 1

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A device for expanding unexpanded, thermally expandable, thermoplastic microspheres, comprising:
   a heating zone having an inlet, and an outlet;
   a pump upstream of and in fluid communication with the heating zone for feeding a slurry of unexpanded, thermally expandable, thermoplastic microspheres into the heating zone, wherein the pump is capable of generating above-atmospheric pressure in the heating zone;
   an element for heating the heating zone to soften the microspheres fed into the heating zone;
   an expansion zone with an inlet and an outlet, said inlet of the expansion zone being connected to the outlet of the heating zone in such a way that a pressure drop is created across the expansion zone inlet, such that a pressure in the expansion zone is at a lower pressure than the heating zone for expanding the microspheres in the expansion zone;
   a distribution pipe located downstream of the expansion zone with a first inlet in fluid communication with the outlet of the expansion zone, a second inlet configured to be fluidly coupled to a cooling medium source and an outlet; and
   an adjustable back pressure generator disposed in the distribution pipe for creating a variable counter pressure to influence the pressure in the expansion zone.

2. A device according to claim 1, wherein the element for heating is configured to heat the slurry passing through the heating zone without direct contact with any fluid heat transfer medium.

3. A device according to claim 2, wherein the back pressure generator is a flow restriction adjuster placed after the outlet of the expansion zone and operable to adjust a volume flow per unit pressure drop in the expansion zone.

4. A device according to claim 2, wherein the back pressure generator comprises a flow adjuster for adjusting the flow of cooling medium through the distribution pipe.

5. A device according to claim 1, wherein the back pressure generator is a flow restriction adjuster placed after the outlet of the expansion zone and operable to adjust a volume flow per unit pressure drop in the expansion zone.

6. A device according to claim 1, wherein the back pressure generator comprises a flow adjuster for adjusting the flow of cooling medium through the distribution pipe.

7. A process for expanding unexpanded, thermally expandable, thermoplastic microspheres comprising a thermoplastic polymer encapsulating a blowing agent, wherein said blowing agent is a liquid having a boiling temperature not higher than the softening temperature of the thermoplastic polymer shell, the process comprising:
   feeding a slurry of unexpanded, thermally expandable, thermoplastic microspheres into a heating zone by a pump capable of generating higher than atmospheric pressure in the heating zone,
   heating the microspheres to a temperature above their softening temperature, while under a pressure sufficiently high to ensure they do not fully expand;
   passing the so-heated microspheres from the heating zone to an expansion zone, such that a pressure drop is created, resulting in a pressure in the expansion zone sufficiently low for the microspheres to expand, and
   removing the expanded microspheres from the expansion zone,
   wherein the expansion zone is configured to create a variable counter pressure by a back-pressure generator downstream of the expansion zone.

8. A process as claimed in claim 7, in which the pressure maintained in the heating zone is from about 10 to about 50 bars.

9. A process as claimed in claim 8, in which the temperature of the slurry in the heating zone is from about 60° C. to about 250° C.

10. A process as claimed in claim 7, in which the temperature of the slurry in the heating zone is from about 60° C. to about 250° C.

11. A process as claimed in claim 7, in which the expansion zone is connected to a downstream outlet pipe, and said outlet pipe flows into a downstream distribution pipe through a connection, said distribution pipe also having an inlet for cooling medium, upstream of the connection, wherein the a flow of cooling medium is fed to the inlet of the distribution pipe.

12. A process as claimed in claim 11, in which the cooling medium a flow of gas, liquid or particles that are inert to the expanded thermoplastic microspheres.

13. A process as claimed in claim 12, in which the cooling medium is selected from air, water, nitrogen, chalk particles, calcium carbonate particles, silica particles, clay particles and $TiO_2$ particles, or any combination thereof.

14. A process according to claim 7, in which the unexpanded thermally expandable, thermoplastic microspheres are fed to a device.

15. A device for processing unexpanded, thermally expandable, thermoplastic microspheres into an expanded form, the device comprising:
   a heater having a heater inlet, a heater outlet, and a heating zone therebetween;
   a pump in fluid communication with the heater inlet for feeding a slurry of unexpanded, thermally expandable, thermoplastic microspheres into the heating zone at a first pressure condition sufficiently elevated about atmospheric pressure to prevent full expansion of the microspheres in a softened state;
   a heating element thermally coupled to the heating zone for heating the microspheres to the softened state;
   an expander having an expander inlet in fluid communication with the heater outlet, an expander outlet, and an expansion zone therebetween, wherein a pressure drop is created across the expander inlet and the expansion zone is at a second pressure condition that is lower than the first pressure condition for expanding the microspheres in the expansion zone; and
   a distribution pipe located downstream of the expansion zone having a first inlet in fluid communication with the expander outlet, a second inlet fluidly coupled to a cooling medium source and an outlet; and
   an adjustable back pressure generator disposed in the distribution pipe for creating a variable counter pressure to influence the pressure in the expansion zone.

16. The device of claim 15 wherein the cooling medium source comprises a cooling medium that is inert to the expanded thermoplastic microspheres.

17. A device according to claim 15, wherein the back pressure generator is a flow restriction adjuster placed after the outlet of the expander and operable to adjust a volume flow per unit pressure drop in the expansion zone.

\* \* \* \* \*